Patented Mar. 24, 1936

2,035,183

UNITED STATES PATENT OFFICE 2,035,183

CELLULOSIC COMPOSITION

Richard Müller, Mannheim, and Fritz Müller, Mannheim-Waldhof, Germany, and Heinrich Messer, Croydon, England, assignors to C. F. Boehringer & Soehne G. m. b. H., Mannheim-Waldhof, Germany No Drawing. Application June 19, 1931, Serial No. 545,498. In Germany June 24, 1930

14 Claims. (Cl. 106—40)

Our invention refers to the art of making plastic masses from cellulose derivatives of the kind comprising cellulose esters and cellulose ethers, and more particularly to mixtures containing a cellulose compound and a softening and/or gelatinizing agent consisting of a glycerine ether.

It is an object of our invention to improve such mixtures with a view to the gelatinizing and softening effect, their stability against decomposition and saponification and the resistivity of the glycerine ethers used to the action of light.

It is another object of our invention to provide means for producing softened and/or gelatinized cellulose derivatives of the kind aforesaid, and of varnishes, films, slabs, tubes, fibres and the like made therefrom.

In its broad aspects our invention consists in the incorporation, in the cellulose derivative, of an ether formed of at least two molecules glycerine and esterified at least at one hydroxyl group with a low molecular aliphatic acid as softening and/or gelatinizing agent. The esters of glycerine ethers, such as described for instance in "Chemisches Zentralblatt", 1913, II, p. 422, are highly viscous liquids of comparatively high boiling point, which are insoluble in water, colourless and tasteless. They have the general formula

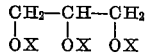

wherein at least one X is a glycerine or polyglycerine radical, while at least one other X stands for the radical of an aliphatic acid such as formic acid or acetic acid. The third X is either hydrogen or another alcohol or acid radical or halogen, for instance chlorine.

The further glycerine or polyglycerine radicals etherified with the glycerine molecule defined above may also be substituted at their hydroxyl groups, either with radicals of low molecular aliphatic acids or with alcohol radicals or generally with any desired atoms or radicals which are not inimical to the desired effect.

In the practice of our invention we may mix, by kneading, the cellulose derivatives with the softening agent until a uniform mixture is obtained, but we may also employ suitable solvents such as for instance acetone containing some ethyl alcohol and some benzene.

Example 1

100 parts by weight acetyl cellulose soluble in acetone and 30–50 parts diglycerine tetra-acetate having the formula

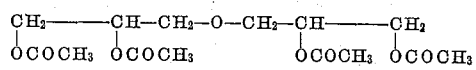

are dissolved in acetone containing some ethyl alcohol and some benzene. The solution is filtered and may be used for the production of varnishes, films, slabs, tubes and similar products. Nitrocellulose and other cellulose esters may be reacted in a similar manner.

Example 2

100 parts by weight methyl cellulose and 50 parts diglycerine tetraacetate are dissolved in about 750 parts of a mixture of equal volumes of methyl alcohol, benzene, toluene and ethyl alcohol. The solution is filtered and may be used in the production of varnishes, films, foils and similar articles.

Example 3

The softening agent in Example 1 is replaced by diglycerine tetraformic ester having the formula

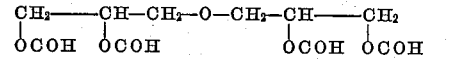

Example 4

The softening agent in Example 1 is replaced by diacetyl diglycerine diformic acid ester having the formula

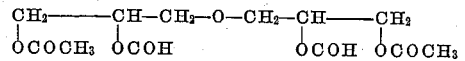

Example 5

The softening agent in Example 1 is replaced by diacetylo dichloro dihydrine having the formula

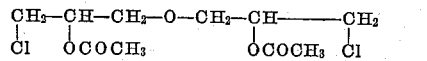

In the claims the term "cellulose derivative" is intended to cover the esters and ethers of cellulose under the exclusion of other derivatives.

Various changes may be made in the details disclosed in the foregoing specification without departing from the invention or sacrificing the advantages thereof.

We claim:—

1. As a new composition of matter the mixture of a cellulose derivative with diglycerine tetraacetate.

2. The mixture of a cellulose derivative with an ether formed of at least two molecules glycerine and esterified with formic acid.

3. The mixture of a cellulose derivative with an ether formed of at least two molecules glycerine and esterified with acetic acid.

4. The mixture of cellulose acetate with an ether formed of at least two molecules glycerine and esterified with acetic acid.

5. The mixture of a cellulose derivative with an ether formed of at least two molecules glycerine and esterified with two different low molecular monobasic aliphatic acids.

6. The mixture of a cellulose derivative with an ether formed of at least two molecules glycerine and esterified with acetic acid and another low molecular monobasic aliphatic acid.

7. The mixture of a cellulose derivative with an ether formed of at least two molecules glycerine and esterified with acetic and formic acid.

8. The mixture of a cellulose acetate with an ether formed of at least two molecules glycerine and esterified with acetic acid and another low molecular monobasic aliphatic acid.

9. As a new composition of matter, a cellulose derivative plasticized by admixture with an ether formed of at least two molecules of glycerine, at least one hydroxyl group of said two molecules of glycerine being esterified with a low molecular monobasic aliphatic acid.

10. The product of claim 9 wherein said cellulose derivative is a cellulose ester.

11. The product of claim 9 wherein said cellulose derivative is a cellulose ether.

12. The product of claim 9 wherein said cellulose derivative is cellulose acetate.

13. The product of claim 9 wherein said cellulose derivative is nitrocellulose.

14. The product of claim 9 wherein said cellulose derivative is methylcellulose.

RICHARD MÜLLER.
FRITZ MÜLLER.
HEINRICH MESSER.